June 20, 1961  B. JONES  2,989,084
EXTERIOR SEAL FOR DIFFERENTIAL PRESSURE GAGES
Filed April 13, 1956
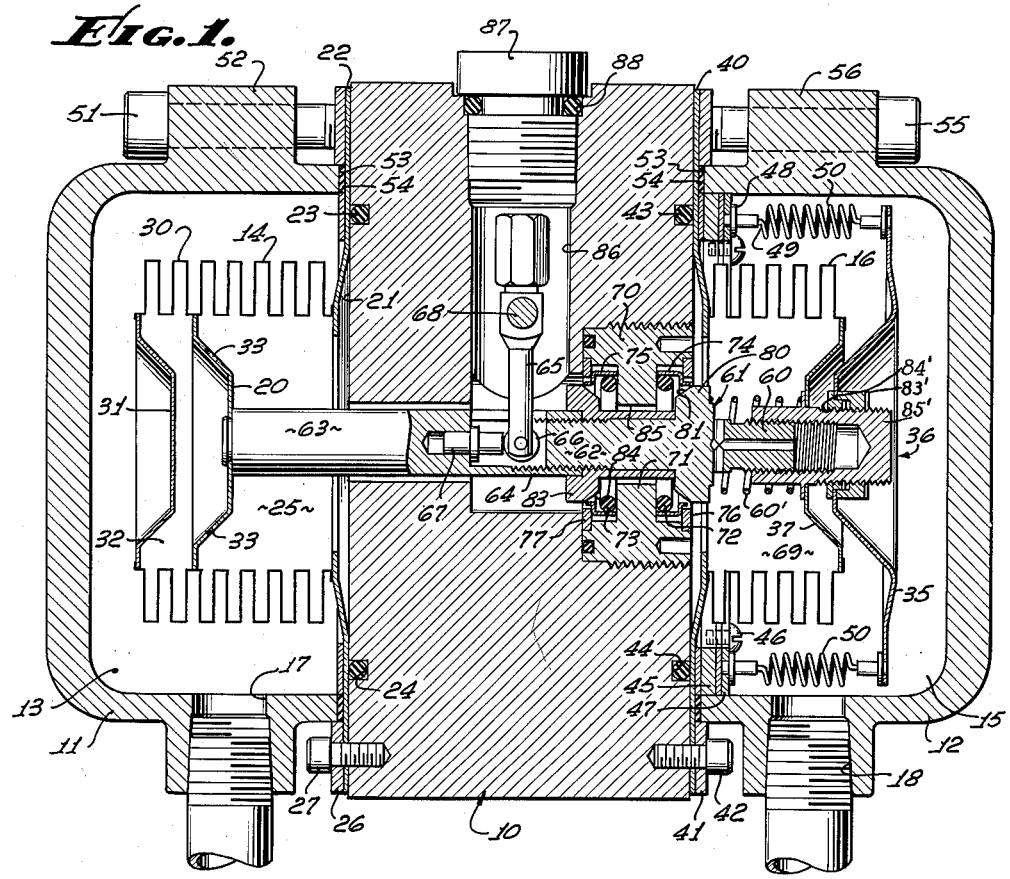
BARTON JONES
INVENTOR.
Huebner, Beehler, Worrel & Herzig.
BY
ATTORNEYS.

United States Patent Office 2,989,084
Patented June 20, 1961

2,989,084
EXTERIOR SEAL FOR DIFFERENTIAL PRESSURE GAGES
Barton Jones, 1320 Woodstock Road, San Marino, Calif.
Filed Apr. 13, 1956, Ser. No. 577,991
6 Claims. (Cl. 137—791)

The invention relates to compound seals adapted to the separation of gaseous material from liquid material in such manner that where gaseous and liquid materials are employed in a mechanism such as a differential pressure gage there will be no possibility of even the most minute quantities of gas finding a way into the liquid chamber. The invention has particular reference to a seal for a differential pressure gage or instrument whereby an incompressible liquid may be securely sealed within a pair of counter-acting bellows in such a way that the chambers for gas under pressure to be measured one against the other are capable of being independently and separately sealed in place around the bellows.

For a considerable number of years the differential pressure type bellows mechanism has received considerable attention as a means for measuring differences in pressure between gases where the gas pressures considered independently are often in a high range. By employing the differential pressure mechanism wherein one gas pressure is balanced against another, small compact measuring units have been possible capable of continued accurate operation and which are especially small and inexpensive considering extremely high pressures being handled. In many instances pressure differential gages of this kind must have a very high degree of reliability. Moreover, they must be capable of continued operation under such strict reliability standards for long periods. In certain types of differential pressure measuring devices heretofore in use it has been found that even when extremely tight and specially constructed seals have been employed at locations sealing the incompressible liquid from gases, pressures of which are to be measured, some minute quantities of the gases tend to pass into the compressible liquid and accumulate there little by little until enough gas has accumulated by this gradual infiltration to throw the measuring device perceptibly in error. One of the principal difficulties lies in the fact that the error is so very gradually cumulative that it continues undetected for a rather long period until the degree of error becomes great enough to be noticeable. The infiltration experienced has been considered as one due to adsorption of the gas by the sealing material under high gas pressure under conditions where, when the pressure is released, the gas adsorbed by the sealing material tends to be given up on both sides of the seal, not only on the gaseous side but on the liquid side.

It is therefore among the objects of the invention to provide a new and improved seal for instruments of the nature of differential pressure gages where in the same compact gage structure the seal for the incompressible liquid is capable of being made separately and independently of the seal for the gases under high pressure.

Another object of the invention is to provide a new and improved external type compound seal by means of which both the incompressible liquid and the gas under high pressure are sealed separately with respect to the atmosphere rather than being sealed against each other.

Still another object of the invention is to provide a new and improved differential pressure type instrument with a seal such that the sealing of the incompressible liquid is one which need not be disturbed when the seal for the gaseous material is broken, thereby permitting ready inspection and cleaning of the exterior of the bellows which is exposed to the gas without it being necessary to disturb the positive seal for the trapped incompressible liquid.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

FIGURE 1 is a longitudinal sectional view of a differential pressure gage or pressure-responsive device incorporating the sealing facilities of the invention.

FIGURE 2 is a fragmentary enlarged sectional view of the external seal revealed in FIGURE 1.

In the embodiment of the invention chosen for the purpose of illustration a differential bellows unit is shown consisting of a partition generally indicated by the reference character 10 on one side of which is a housing 11 and on the other side of which is a housing 12. The housing 11 contains a pressure chamber 13 within which is mounted a flexible bellows 14. On the opposite side the housing 12 contains a pressure chamber 15 within which is mounted a similar bellows 16. A pressure port 17 admits gas under pressure to the chamber 13 and a similar pressure port 18 admits gas under pressure to the chamber 15. The gas pressures are thus admitted to the mechanism on opposite sides of the partition so that they may be measured one with respect to the other.

The bellows 14, for example, has a somewhat dished perforate end 20 which is movable with the expansion and retraction of the bellows. For mounting the bellows on a face 21 of the partition 10 the bellows is provided with a wide flange 22 which extends out to the outermost perimeter of the face 21. A packing ring 23 which may be an O ring or some similar appropriate packing is contained in an annular recess 24 and serves as a seal for a bellows chamber 25. To make the seal tight there is provided an annular ring 26 which extends over the flange 22 on the portion of the flange exterior to the housing 11. At suitably spaced intervals around the ring are cap screws 27 by means of which the flange with the aid of the ring is bolted fast to the face 21 of the partition 10.

An auxiliary bellows 30 providing a temperature compensating extension is mounted on the bellows 14 only. The auxiliary bellows includes a closed end 31 housing a chamber 32 which communicates with the chamber 25 through small orifices 33 in the end 20.

The bellows 16 is provided with a flange 40 retained by a ring 41 and cap screws 42 in order to make tight a seal 43 in an appropriate recess 44, in the same fashion as was described in connection with the bellows 14. A laminated anchor ring 45 fixed upon the flange 40 by appropriate conventional means is adapted to receive mounting bolts 46 by means of which a spring mounting ring 47 serving as a spring-keeper is secured to the anchor ring. Rivets 48 are secured to the anchor ring and each rivet has an end 49 of a spring 50 secured therein as by welding or by brazing. A spider 35 mounted on a fitting 36 is connected to a movable end 37 of the bellows 16.

The housing 11 is secured to the partition 10 by means of bolts 51 extending through a flange 52 and the ring 26 and thence into appropriate threaded apertures (not shown) in the partition 10. Beneath an edge 53 of the housing is a packing ring 54 of some suitable material capable of sealing a gas under high pressure within the chamber 13. The seal is made tight by pulling down on the bolts 51. The housing 12 is similarly fastened to the partition by bolts 55 extending through a flange 56 and the ring 41. A valve stem 61 has a threaded extension 60 connected to the bellows 16 at its movable end 37. In the chosen embodiment the valve stem is also attached to the movable end 20 of the bellows 14. A spring 60' may be employed to lock the threaded joint.

The valve stem 61 is of composite construction consisting of a stem element 62 in threaded engagement with a stem element 63. A sleeve 64 integral with the stem element 63 interconnects the elements 63 and 62. A rocker arm 65 having a roller 66 bearing upon a plug 67 in the element 63 is adapted to transfer motion of the bellows to a shaft 68 which extends through an appropriate packing gland to the exterior.

To provide necessary communication for liquid between the bellows chambers there is provided a passage 85 communicating with the bellows chamber 25 in the bellows 14 and bellows chamber 69 of the bellows 16.

A bushing 70 is threadedly mounted in the partition 10 and includes an annular portion 71 on opposite sides of which are soft valve rings 72 and 73. The rings are held in position respectively by retainers 74 and 75 and snap rings 76 and 77.

Following accepted practice the stem element 62 includes a valve element 80 having a valve face 81 adapted to seat upon the soft valve ring 72. Similarly a valve element 83 has a valve face 84 adapted to seat upon the valve ring 73 for the established purpose of closing off communication through a passage 85 between the bellows chambers in a manner already well-known when pressures within the chambers 15 and 13 exceed a predetermined amount.

A pocket 86 accommodates the rocker arm 65 and is closed by a plug 87 and seal 88.

Of considerable advantage is the means for setting the springs 50 at a desired tension. To accomplish this the spider 35 is mounted between nuts 83' and 84'. These nuts threaded interiorly as indicated engage the threaded exterior projection 85' of the fitting 36. Upon assembly the pair of nuts is threaded onto the projection 85 until the inner ends of springs 50 are in about the correct position for proper tension. If tension needs to be adjusted one way or the other, the fitting need be rotated only a fraction of a revolution with respect to the threaded parts to a position where the bolts 46 face opposite the next adjacent set of holes in the anchor ring 45. Hence the springs may be tensioned or released by small increments until the correct tension is found.

When the device is assembled the bellows are mounted and the flanges sealed as heretofore described. The interiors of the bellows and all of the interconnecting passageways are then filled with an incompressible liquid which may be kerosene or some similar type of liquid, during which time special precaution is taken to exhaust all air and gas from those chambers. When the chambers have been filled and sealed the housings 11 and 12 can be applied and their seals made tight independent of the seals for the bellows flanges. As gases under pressure are admitted to the pressure ports 17 and 18 the differences in pressures cause a shift to right or to left of the bellows and the composite valve assembly connecting them, the shift being reflected on a suitable gage of conventional pressures cause a shift to right or to left of the bellows and the composite valve assembly connecting them, the shift being reflected on a suitable gage of conventional design through the agency of the rocker arm 65 and shaft 68. Since the packing ring 23 and packing ring 43 seal the interiors of the bellows against atmosphere where atmospheric pressure is at the normal approximately fifteen pounds per square inch, there is no likelihood of the infiltration of air past the seals at any time. On the other hand, although the pressures in the chambers 13 and 15 may vary to a considerable amount upwards of several hundred pounds, the packing rings merely seal the interiors of those chambers with respect to atmosphere as do the seals 23 and 43. Hence there is no possibility of inadvertent leak between chambers outside the bellows and chambers inside the bellows.

Should it be necessary for any reason to remove the housings in order to clean the exterior of the bellows, these housings may be removed without it being necessary to disturb the remaining portions of the device including the seal for the incompressible liquid. Since all of the parts within the bellows are sealed and immersed in a suitable liquid, much less attention need be given them over long periods of service. Hence, the assembly herein described is one which by reason of the separation of the liquid seal from the gaseous seal can be counted upon for long periods of service without likelihood of inaccuracies creeping into the measurements and which, moreover, has those parts which may need more frequent cleaning and servicing made readily accessible without disturbing the remaining parts.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. In a differential pressure unit a partition, a housing on each side of the partition forming a chamber on each respective side, passage means interconnecting said chambers, an access pocket in the partition communicating between said passage means and the atmosphere and a sealed plug closing said pocket, a bellows in each chamber having a flange extending to the exterior of the respective housing, a first seal between each flange on one side thereof and the partition, a second seal independent of the first seal between each flange on the other side and the respective housing, and fastening means connected to each housing and the partition adapted to draw seals on both sides of the flanges into sealing condition, and a second fastening means between the flange and the partition adapted to secure the first seal independently of the second seal.

2. In a differential pressure unit a partition, a housing having a pressure chamber therein, said housing having an annular portion facing said partition and means forming a passage from said chamber through the partition, a flexible expansible means in the chamber forming an interior space containing a liquid and dividing said chamber into said interior space and an exterior space containing a fluid under pressure, said expansible means having a movable closed portion, a flange on the expansible means extending outwardly to atmosphere, a first sealing means between the partition and one face of the flange sealing the liquid in said interior space against atmosphere, and a second sealing means between the opposite face of the flange and said annular portion for retention of fluid in said exterior space, whereby leakage past either the first or second sealing means escapes directly to the ambient atmosphere, clamping means securing the flange and said first sealing means to the partition and another clamping means securing the second sealing means and the housing to the partition.

3. In a differential pressure unit a partition, a housing having a pressure chamber therein, said housing having an annular portion facing said partition and means forming a passage from said chamber through the partition, a flexible expansible means in the chamber forming an interior space containing a liquid and dividing said chamber into said interior space and an exterior space containing a fluid under pressure, said expansible means having a movable closed portion, a flange on the expansible means extending outwardly to atmosphere, a first sealing means between the partition and one face of the flange sealing the liquid in said interior space against atmosphere, and a second sealing means between the opposite face of the flange and said annular portion for retention of fluid in said exterior space and comprising a seal between said exterior space and the ambient atmosphere, clamping means securing the flange and said first sealing means to the partition and another clamping means securing the second sealing means and the housing to the partition, said other clamping means acting simultaneously to impress the flange and the first sealing means against the partition.

4. In a differential pressure unit a partition, a housing having a pressure chamber therein, said housing having an annular portion facing said partition and means forming a passage from said chamber through the partition, a flexible metal bellows in the chamber, said bellows having a movable closed end and having an open end, a relatively wide flange on the bellows extending outwardly to atmosphere from the open end and forming an annular area, a first clamping means attached to the housing and extending past said annular area and acting between the housing and the partition whereby to secure said housing to the partition, a second clamping means engaging the flange and the partition and securing said flange to the partition independently of the means securing the housing to the partition, sealing means between the partition and one face of said flange secured in sealed position by said second clamping means and a second independent sealing means between an opposite face of said flange and the annular portion of the housing secured by said first clamping means.

5. In a differential pressure unit a partition, a housing on each side of the partition separated one from the other forming a chamber on each respective side, passage means interconnecting said chambers, a bellows in each chamber having a flange extending to the exterior atmosphere about the respective housing, a separate gas pressure port to each chamber at the portion thereof surrounding the outside of the bellows, a mass of substantially incompressible liquid of fixed volume contained inside said passage and the interiors of said bellows, a first seal between each flange on one side thereof and the partition sealing the interior of the bellows against atmosphere, a second seal independent of the first seal between each flange on the other side and the respective housing sealing the respective chamber against atmosphere, whereby leakage past either the first or second seal escapes directly to the ambient atmosphere, and means connecting each housing to the partition whereby said seals on both sides of the flanges are drawn into sealing condition.

6. In a differential pressure unit a partition, a housing on each side of the partition forming a chamber on each respective side, each said housing being separately removable from the partition, passage means interconnecting said chambers, a bellows in each chamber having a flange extending to the exterior atmosphere about the respective housing, a separate gas pressure port to each chamber at a portion thereof surrounding the outside of the bellows, a mass of substantially incompressible liquid of fixed volume contained inside said passage and the space inside said bellows, a first seal between each flange on one side thereof and the partition, a second seal independent of the first seal between each flange on the other side and the respective housing, and fastening means having a pressure engagement with each housing and the partition adapted to draw seals on both sides of the flanges into sealing condition, and a second fastening means between the flange and the partition adapted to secure the first seal independently of the second seal.

References Cited in the file of this patent

UNITED STATES PATENTS

| | | |
|---|---|---|
| 379,586 | Mason | Mar. 20, 1888 |
| 1,646,376 | Waddell | Oct. 18, 1927 |
| 1,658,951 | Stitt | Feb. 14, 1928 |
| 1,758,644 | Betts et al. | May 13, 1930 |
| 1,855,696 | Stover | Apr. 12, 1932 |
| 2,264,028 | Molden | Nov. 25, 1941 |
| 2,302,407 | Waddell | Nov. 17, 1942 |
| 2,400,048 | Jones | May 7, 1946 |
| 2,466,071 | Barnes et al. | Apr. 5, 1949 |
| 2,589,291 | Sanford | Mar. 18, 1952 |
| 2,700,506 | Berntson | Jan. 25, 1955 |
| 2,762,391 | Reese | Sept. 11, 1956 |

FOREIGN PATENTS

| | | |
|---|---|---|
| 511,040 | Canada | Mar. 15, 1955 |